United States Patent [19]

Tejeda

[11] Patent Number: 5,510,027

[45] Date of Patent: Apr. 23, 1996

[54] CONCENTRIC ANNULAR FILTERS FOR PURIFYING WATER

[76] Inventor: Alvaro R. Tejeda, 7 W. 108th St., New York, N.Y. 10025

[21] Appl. No.: 423,707

[22] Filed: Apr. 18, 1995

[51] Int. Cl.[6] .................................................. B01D 1/28
[52] U.S. Cl. ........................... 210/282; 210/286; 210/449
[58] Field of Search ................................. 210/266, 282, 210/449, 285, 286

[56]         References Cited

U.S. PATENT DOCUMENTS

| 146,590 | 1/1874 | Heinz | 210/285 |
|---|---|---|---|
| 246,457 | 8/1881 | Candlish | 210/449 |
| 359,259 | 3/1887 | Kaiser | 210/449 |
| 385,440 | 7/1888 | Birkery | 210/449 |
| 560,261 | 5/1896 | Durant | 210/449 |
| 746,292 | 12/1903 | Clark | 210/285 |
| 789,968 | 5/1905 | Ernst | 210/286 |
| 938,947 | 11/1909 | Andrés et al. | 210/449 |
| 1,090,283 | 3/1914 | Crandall | 210/286 |
| 3,204,770 | 9/1965 | Brink | 210/449 |
| 3,208,595 | 9/1965 | Butler | 210/285 |
| 3,760,951 | 9/1973 | Mansfield | 210/449 |
| 4,001,120 | 1/1977 | Gelman et al. | 210/449 |
| 4,212,743 | 7/1980 | Van Meter et al. | 210/286 |
| 4,218,317 | 8/1980 | Kirschmann | 210/449 |
| 4,642,192 | 2/1987 | Heskett | 210/903 |
| 4,749,481 | 6/1988 | Wheatley | 210/282 |
| 4,911,840 | 3/1990 | Underwood | 210/449 |
| 5,076,922 | 12/1991 | DeAre | 210/282 |
| 5,152,464 | 10/1992 | Farley | 210/449 |
| 5,211,973 | 5/1993 | Nohren, Jr. | 210/449 |
| 5,300,224 | 4/1994 | Farley | 210/449 |
| 5,385,667 | 1/1995 | Steger . | |
| 5,415,770 | 5/1995 | Heskett | 210/266 |

*Primary Examiner*—Cynthia L. Nessler
*Attorney, Agent, or Firm*—Scully, Scott, Murphy & Presser

[57]         ABSTRACT

A filter apparatus for water purification is provided. A compact housing has a disk filter including concentric chambers connected in series with divided water flow in opposite directions in each chamber with one water tank input and one purified water output.

10 Claims, 1 Drawing Sheet

CONCENTRIC ANNULAR FILTERS FOR PURIFYING WATER

BACKGROUND OF THE INVENTION

1. Field of the Invention

A method and apparatus for purifying potable water in a highly compact concentric disk device for domestic use and other applications.

2. Description of the Prior Art

The presence of lead and chlorine in drinking water is objectionable for human consumption. It, therefore, is considered desirable and often necessary, to subject drinking water containing such chemical substances to treatment prior to its use.

Perhaps the most common and least tolerable chemical impurities in drinking water are lead and chlorine. Lead poisoning (plumbism) is a chronic disorder, sometimes punctuated by recurrent acute symptomatic episodes, that may result in chronic irreversible effects (e.g., cognitive deficits in the child and progressive renal disease in adults). Chlorine usually cause mild pain and inflammation or oral and Gl mucosa; cough, dyspnea, vomiting, skin vesicles and also adversely affects the taste of the drinking water and canned foods.

One of the standard methods of treating drinking water is by reverse-osmosis. In the treatment of water by this process pure water molecules are filtered through a special plastic membrane under pressure, leaving the chemical impurities behind.

This method while reasonably effective, has always possessed certain disadvantages, such as low flow rate of purified water, i.e. typically 3 hours per gallon. Furthermore, this system is expensive to buy ($400.00 to $750.00), and may require professional installation, and waster water at a rate of about 15 to 30 gallons a day.

A well known and effective method for removing lead is the distillation process, using distillers. A distiller uses electricity to boil water. The rising steam leaves lead behind, because lead's boiling point is far higher than water's. A fan helps condense the steam onto metal coils, an clean water drips out the spout into a collection jug. One of the disadvantages of this method is its very low rate of purified water production, i.e. seven hours per gallon. Although a distiller's initial price ($100.00) is less than that of a reverse-osmosis system, it costs much more to operate. Distilling 1,000 gallons will have an average cost of $237.00 at the nation's average electricity rate of 8.25 cents per kilowatt-hour.

Another device for water purification is the so-called undersink filters. These devices are attached to the cold-water line and typically send water through a prefilter, then through a lead-removing filter and out the unit's countertop spigot.

This device is suitable for a household that uses lots of water. They are less expensive and easier to install than reverse-osmosis devices, however, their lead removal effectiveness is less, typically 88–92%. Price ranges from $189.00 to $330.00 with an operating cost from $44.00 to $226.00 per year.

Another method of purifying water at home is by using countertop filters. A diverter with a valve inside attaches to the existing faucet, in place of the aerator. When the filter is not in use, water flows from the faucet as usual. To draw treated water, a diverter valve is actuated which shunts water through the filter and out through the unit's spigot.

Like an undersink filter, a countertop model provides filtered water on demand, but it requires no major changes in plumbing. It does take up counter space, and its connector tubes can get in the way when you're using the sink. Prices range from $65.00 to $227.00 with an annual operating cost of $25.00 to $110.00.

SUMMARY OF THE INVENTION

It is a principal object of the present invention to provide a highly compact apparatus and process using a concentric disk filter device for the removal of lead and chlorine from drinking water, that may be connected directly to a faucet.

It is another object of the invention to provide a compact and portable concentric disk filter device which accommodate a large flow of water in a small volume space.

It is another object of the invention to provide a concentric disk filter device for purifying water at low pressure drop and high efficiency.

It is another object of the invention to provide a water purifier device which does not require any installation, it's very easy to handle due to its small volume, on which connecting tubing is not required and which does not require any countertop space.

According to the present invention, the purification of water is accomplished inside a highly compact housing having a disk filter comprising concentric chambers connected in series with divided water flow in opposite directions in each chamber with one water input and one purified water output.

BRIEF DESCRIPTION OF THE DRAWINGS

In the accompanying drawings in which are shown various possible embodiments of the invention.

PREFERRED EMBODIMENTS OF THE INVENTION

Figure 1:
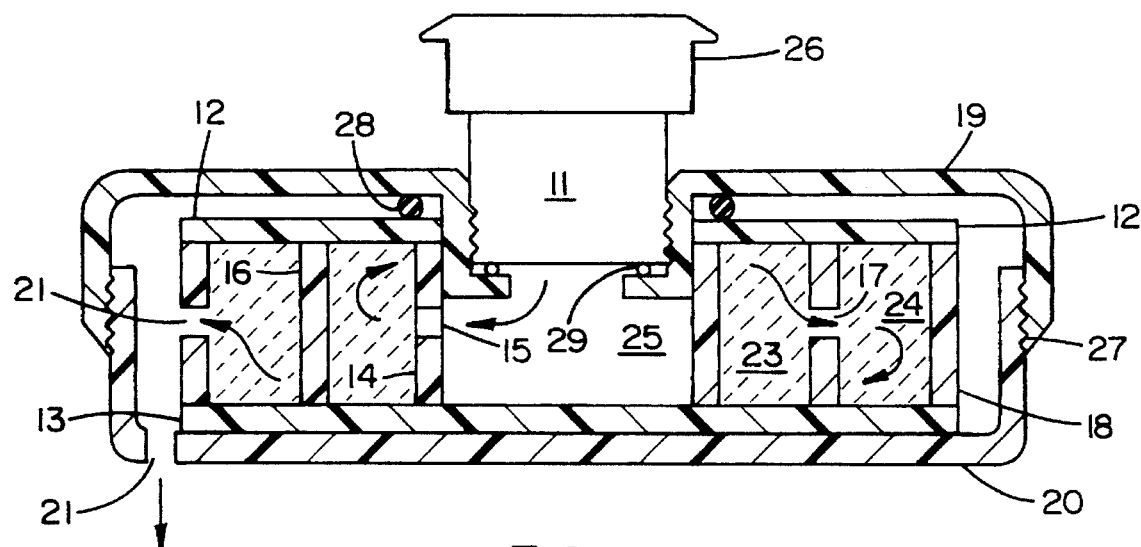
FIG. 1 is a schematic and cross-sectional side view of water purification device with an inner disk-cartridge for effecting the process of purifying water.
Figure 2:
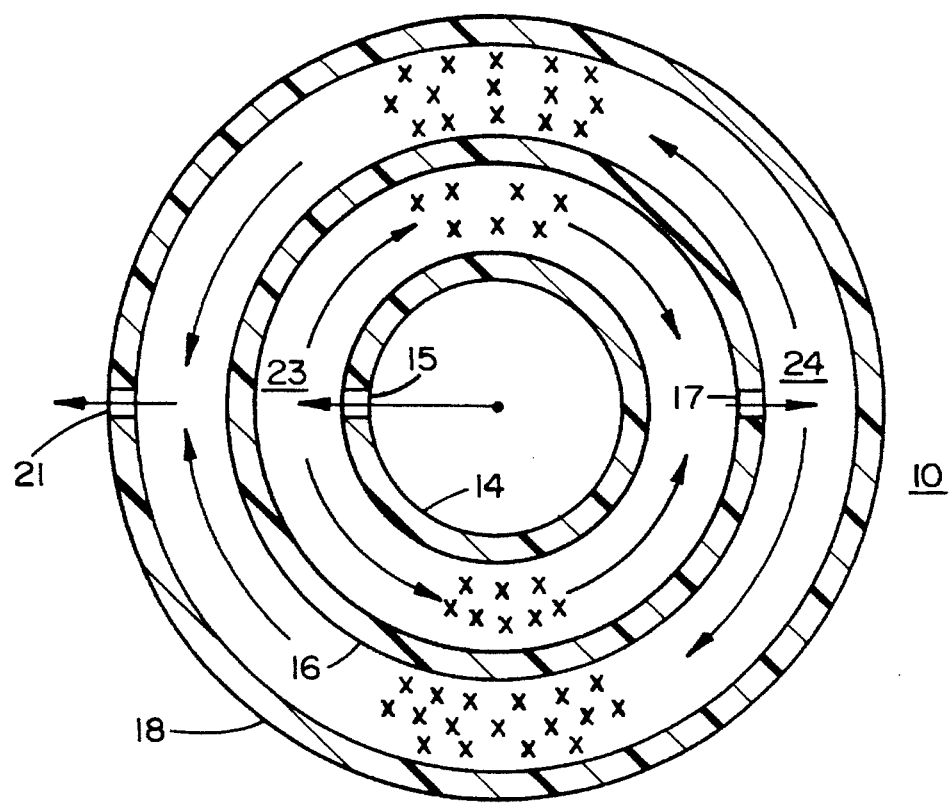
FIG. 2 is a schematic and cross-sectional top view of a disk-cartridge for effecting the process of purifying water.

As illustrated in FIGS. 1 and 2, there is illustrated a simple form of the highly compact water purification device having concentric disk cartridge 10 for carrying out the present invention. The cartridge has two concentric annular chambers 23, 24, the chamber 23 being an inner chamber containing an active filter material and the chamber 24 being an outer chamber also containing an active filter material. Both chambers 23 and 24 are defined by concentric cylinders 14, 16 and 18 and by top closure 12 and bottom closure 13.

Raw water is supplied through an inlet conduit 11 to the chamber 25 and liquid leaves said chamber through a hole 15 into chamber 23. In chamber 23 the liquid divides into two concentric flow patters as illustrated in FIG. 2, contacting the active material and leaves said chamber through a hole 17 into chamber 24. In chamber 24, similarly, the liquid divides again into two concentric flow patterns contacting the active material and exit said chamber through an outlet hole 21 as purified water. Typically the raw water is tap water which may contain health hazardous troublesome materials such as chlorine or heavy metals such as mercury or lead in solution which it is desired to remove.

The cartridge is mounted within a highly compact filter apparatus, as illustrated in FIG. 1 which may be mounted directly on a domestic or potable water faucet without any requirement for hoses, counterspace or the like. Further, the filter apparatus is mounted to the faucet by means of a snap coupling 26 which may be releasably secured or detached from a conventional faucet for travel with the consumer. The trap coupling 26 is mounted on a nipple 11 which threadably engages an upper housing member 19. Housing member 19 is threadably coupled at 27 to a lower housing member 20 to secure a replaceable and remountable disk cartridge 10 therein. A first O-Ring 28 provides resilient mounting and seal for the cartridge 10, while a second O-Ring 29 seals the water purification device to nipple 11.

When the active ingredient in the disk filter has been exhausted, the lower portion of the housing is unthreaded, and a new cartridge is slipped into the device in a simple and expeditious manner. The lower and upper halves of the apparatus are then screwed back together for normal operation of the device.

The active ingredient in chambers 23 and 24 of the water purification device is process media, which through a combination of electrochemical, redox and adsorption actions reduce and remove unwanted contaminants such as chlorine, hydrogen sulfide, iron or heavy metals such as lead or mercury. Any suitable process media can be employed, which may contains activated carbon therein. A suitable process media is KDF® 55 Medium, as manufactured by KDF Fluid Treatment Inc. in Constantine, Mich. This media is especially suitable for use as an active ingredient in the present apparatus since it has the ability to remove large amounts of contaminants from drinking water even though these contaminants are present in small concentrations.

KDF® 55 is a granulated form of atomized high purity Copper/Zinc alloy having a particle size of 2.00 mm to 0.149 mm, or a U.S. mesh screen size of −10 to +100. It is serviceable from 35° to 212° F. By atomized, we mean that the Cooper/Zinc Alloy is reduced into fine particles.

KDF® may be used in both inner 23 and outer 24 chambers, or in the alternative activated charcoal may be used in one of the chambers. Activated charcoal suitable for the present invention may be purchased from Aquarium Pharmaceuticals Inc. of Chalfont, Pa.

Typically the process media employed in the instant invention is able to remove from 70% to 90% of the impurities, such as chlorine, lead or mercury, from drinking water.

Under normal operation conditions, the cartridge containing the active ingredient needs to be replaced every 3 months or so otherwise the active ingredient will have a very low affinity for removing impurities from drinking water.

EXAMPLE 1

In order to further illustrate the invention typical apparatus parameters will be given for the operation of the cartridge depicted in FIGS. 1 and 2. Both top and bottom housing members 12, 13 are plastic, and ⅛" thick ×4" diameter, The effective volume of active material is 6.18 cubic inches, with the volume of the inner chamber 23 being 2.35 cubic inches and the value of the outer chamber 24 being 3.83 cubic inches. The height of both chambers is 0.75". Both chambers were filled with KDF® as its active material.

FILTER PERFORMANCE

Incoming feed water containing 2.7 ppm $Cl_2$
Volume of Product Water: 3,000 Cu.cm.
Processing Time: 19 minutes
Pressure Drop: 5.5 psi
Product water discharged contained 0.9 ppm of $Cl_2$
Chlorine Removed: 66.7%
Productivity: 2.5 gallons per hour

EXAMPLE 2

The housing member of Example 1 was utilized, with the inner chamber filled with KDF® and the outer chamber filled with activated carbon as active materials.

FILTER PERFORMANCE

Incoming feed water containing 2.7 ppm $Cl_2$
Volume of Product Water: 4,000 Cu.cm.
Processing Time: 20 minutes
Pressure Drop: 2 psi
Product water discharged contained 0.6 ppm $Cl_2$
Chlorine Removed: 77.8%
Productivity: 3.2 gallons per hour

EXAMPLE 3

The housing and active ingredients of Example 2 were utilized, with the addition of NaOCl and NaCl to the product water to raise the product water to 2.7 ppm $Cl_2$ and about 200 ppm of TDS. (TDS is defined as total concentration of ions that is dissolved in water).

FILTER PERFORMANCE

Incoming feed water containing 2.7 ppm $Cl_2$ and 200 ppm TDS.
Volume of Product Water: 4,000 Cu.cm.
Processing Time: 17 minutes
Pressure Drop: 2 psi
Product water discharged contained 0.3 ppm $Cl_2$
Chlorine Removed: 88.9%
Productivity: 3.7 gallons per hour

EXAMPLE 4

An extended 8 hour test was also conducted with the housing and active materials of Example 2 with a feed water having a substantially lower concentration of chlorine.

FILTER PERFORMANCE

Incoming Feed Water Containing 0.7 ppm of $Cl_2$
Volume of Product Water: 92,000 Cu.cm.
Processing Time: 473 minutes
Pressure Drop: 2 psi (initial)—3.5 (final)
Product water discharged contained 0.2 ppm $Cl_2$
Chlorine Removed: 71.4%
Productivity: 3.1 gallons per hour The invention has been described with respect to a specific Example and a preferred process media which is considered to be a preferred embodiment of the invention, it will of course be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

I claim:

1. A detachable and portable filter apparatus for water purification that may be easily and quickly connected and removed from a water faucet for domestic and travel purposes, said apparatus comprising:

(a) a snap coupling for releasably attaching said water purification apparatus to said water faucet, said snap coupling providing an inlet path for water to be filtered and a support means for suspending the apparatus from said water faucet, said snap coupling providing quick release when said apparatus is detached from said water faucet for travel purposes;

(b) a disk shaped housing member, said housing member having a chamber for receiving water to be filtered from said snap coupling inlet path, said housing member having a diameter and a height, with the diameter greater than the height, said housing member having:

(i) an upper member attached to said snap coupling, said upper member having a housing inlet for receiving water to be filtered from said snap coupling inlet path;

(ii) a lower member attached to said upper member, said lower member defining a water discharge opening in a lowermost surface thereof:

(c) a removable and disposable filter unit mounted in said housing member, said filter unit having at least one circular baffle, said filter unit providing a plurality of bi-directional annular flow paths for water as it passes through said filter unit, said filter unit comprising:

(i) an inner circular sidewall which defines an inlet chamber for receiving water to be filtered from said housing inlet, said inner circular sidewall having a first orifice through which water to be filtered flows;

(ii) at least one circular baffle concentric to and surrounding said inner circular sidewall, said baffle having a second orifice disposed 180 degrees from said first orifice;

(iii) an outer circular sidewall concentric to and surrounding said at least one circular baffle, said outer circular sidewall having a third orifice disposed 180 degrees from said second orifice, said third orifice defining an outlet of said filter unit for discharging filtered water into said housing member, the filtered water exiting said housing member through said water discharge opening;

(iv) a first annular filter element defining a first bi-directional and circular flow path between said inner circular sidewall and said circular baffle, whereby water to be filtered is passed in said first bi-directional and circular flow path from said inlet chamber through said first annular filter element;

(v) a second annular filter element defining a second bi-directional and circular flow path between said circular baffle and said outer circular sidewall, whereby water to be filtered is directed through said second orifice which reverses the direction of flow as the water passes from said first flow path to said second flow path;

whereby said filter apparatus provides a detachable portable water filter with an extended filter flow path.

2. A filter apparatus as claimed in claim 1 wherein said first and second annular filter elements are formed of a granulated bimetallic ion exchange material.

3. A filter apparatus as claimed in claim 2 wherein said bimetallic ion exchange material includes an atomized copper/zinc alloy.

4. A filter apparatus as claimed in claim 1 wherein one of said first or said second annular filter elements is activated charcoal.

5. A filter apparatus as claimed in claim 4 wherein one of said first or said second annular filter elements is activated charcoal and the other of said first or said second annular filter elements is an atomized copper/zinc alloy.

6. A highly compact, detachable and portable filter apparatus for water purification as claimed in claim 1 in which the ratio of said diameter to said height is at least three to one.

7. A detachable and portable filter apparatus for water purification as claimed in claim 6 in which the diameter is approximately 4 inches and said height is approximately one inch, wherein said extended filter flow path exceeds 8 inches in length.

8. A filter apparatus as claimed in claim 1 wherein said extended filter flow path exceeds 8" in length through a total filter volume in excess of 6 cubic inches.

9. A filter apparatus as claimed in claim 8 wherein said first and second annular filter elements are formed of a granulated bimetallic ion exchange material.

10. A filter apparatus as claimed in claim 9 wherein said bimetallic ion exchange material is an atomized Copper/Zinc alloy.

* * * * *